Figure 1:
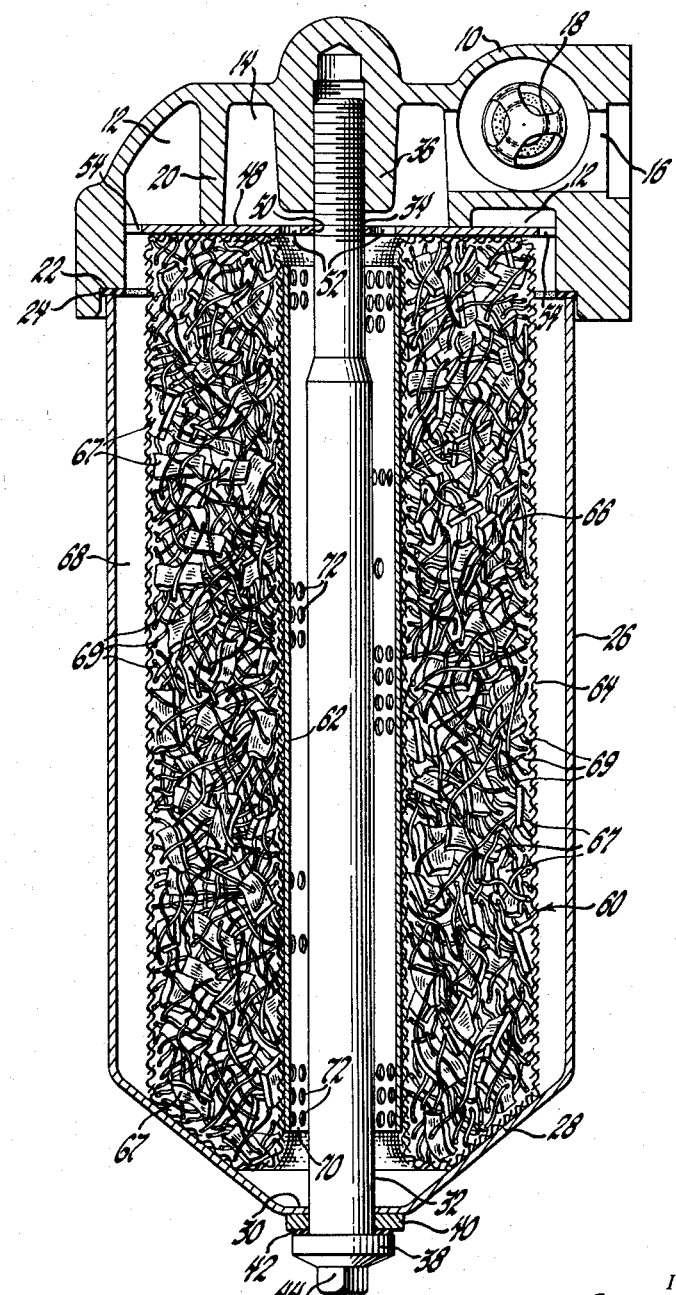

Dec. 18, 1962

G. W. COLBY 3,069,017

DEPTH TYPE FIBROUS FILTER ELEMENTS

Filed March 2, 1959

2 Sheets-Sheet 1

INVENTOR.
Gerald W. Colby
BY
George Johnson
ATTORNEY

Dec. 18, 1962 G. W. COLBY 3,069,017
DEPTH TYPE FIBROUS FILTER ELEMENTS
Filed March 2, 1959 2 Sheets-Sheet 2
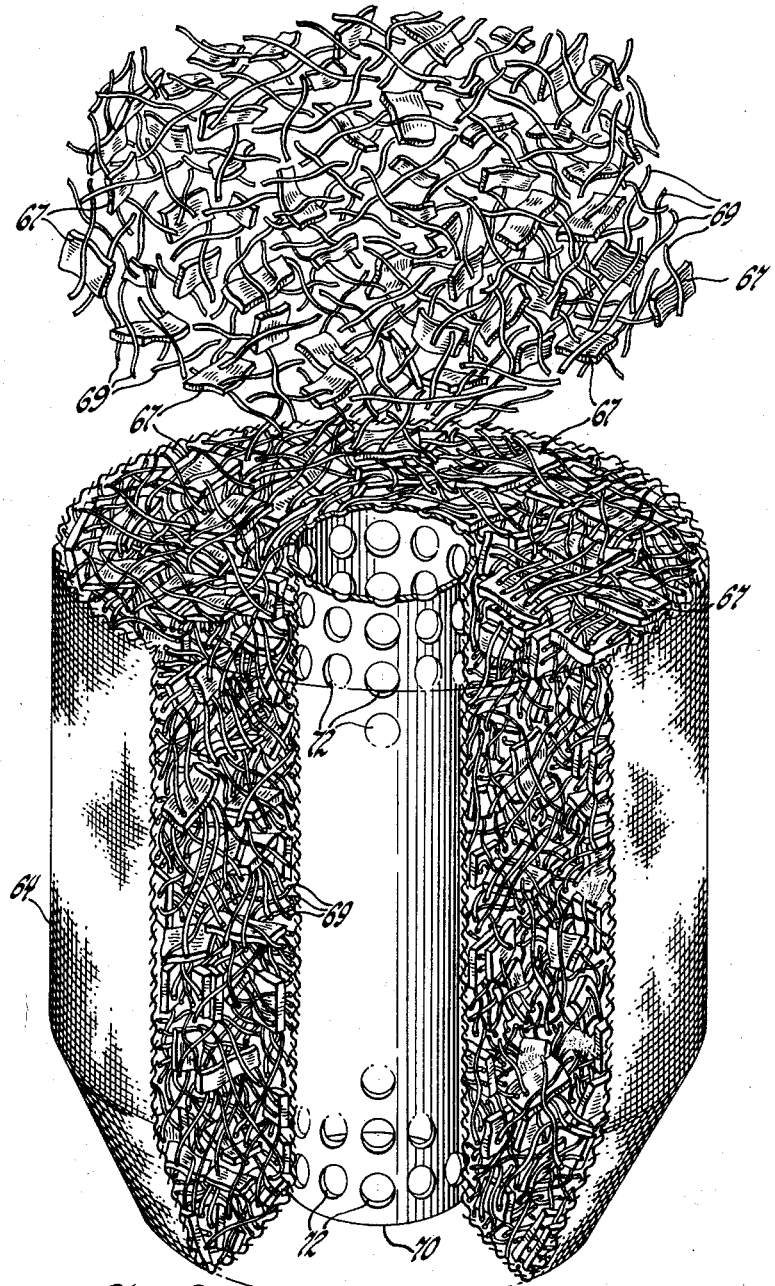
INVENTOR.
Gerald W. Colby
BY
George E. Johnson
ATTORNEY

United States Patent Office 3,069,017
Patented Dec. 18, 1962

3,069,017
DEPTH TYPE FIBROUS FILTER ELEMENTS
Gerald W. Colby, Davison, Mich., assignor to General Motors Corporation, Detroit, Mich., a corporation of Delaware
Filed Mar. 2, 1959, Ser. No. 796,418
6 Claims. (Cl. 210—484)

This invention relates to filters and more particularly to filter elements for removing foreign material or dirt from liquids such as lubricating oils or other hydrocarbon fluids. The present application is a continuation-in-part of the United States application Serial No. 548,077, filed November 21, 1955, now abandoned.

Fibrous filter elements have heretofore been employed for clarifying fluid such as lubricating oil. Mixtures of cellulosic fibers derived from sugar cane, bagasse, corn stalks, ground wood, cotton, jute and other organic materials have been used in such elements with varying degrees of success. It has been found, however, that in the use of such materials up to the present, the creation by various expedients of a large exposure area for the fluid to be clarified has been accomplished with an undesirable decrease in the ability to filter out small particles or an increase in the pressure drop in the fluid passing through the filter element. In the automotive field attempts have been made prior to the present invention to use depth type filters using masses of filter material in clarifying the full flow of lubricating oil rather than clarifying only a part of the flow as is customary. Results have heretofore been as above indicated—ie.—either filtering has not been effective or the filter mass became clogged after a short interval of use. A surface type filter element using porous paper as a filtering medium, instead of a depth type filter mass, will serve for full flow but it is inadequate insofar as effectiveness of dirt removal and length of usefulness is concerned or is desired.

The situation as presented in the foregoing paragraph may be better understood by consideration of the development in recent years of filters for purifying engine lubricating oil. Prior to the development of porous paper in sheet form as a filter medium, full flow filtration of engine lubricating oil was impractical. The industry was compelled to be content with partial flow filtration as afforded by the depth type filter using cellulosic fiber, usually cotton waste, as a single-phase filter medium. While cotton waste filter is very effective in removing solid and semi-solid (sludge) contaminate, it presents an inordinately high restriction to the passage of oil, hence, its use was restricted to partial flow filtration. Because of this high restriction, it was placed in a bypass or shunt circuit in parallel with the engine lubricating system where it would receive the full pump pressure (35 to 60 pounds per square inch). Despite such arrangement, its flow was restricted to only about 5 to 10 percent of the total oil flow through the engine. This assured a very satisfactory low level of contaminate in the oil, but it did not provide full flow filtration and it did not trap the relatively few but harmful abrasive particles before the latter had opportunity adversely to affect the engine. This situation is particularly true with respect to "built-in dirt" of new engines.

Eventually, the filtering industry developed a porous, resin impregnated filter paper, as referred to above, and when this paper was fabricated into a filter element, it provided a greatly expanded surface area for effectively contacting the oil despite the limited volume of the filter elements in which that paper was used. Because of this large surface area, restriction to the flow of oil was very low, hence, full flow filtration for internal combustion engines became practical. It is to be noted, however, that even though it was practical, the degree of filtration using such paper proved not as high as desirable.

In attempts, prior to the present invention, to attain the advantage of the high degree of filtration provided by depth type filter medium in full flow application, only partial flow filtration was obtained as most of the flow would pass through the filter mass in its full flow functional position without being affected by the filter. With this background acquired, the present invention was subsequently developed and a true depth type full flow filter element for the full flow filtration of lubricating oil for internal combustion engines came into being. It was found that a homogenous mixed two-phase filter medium would serve admirably. Contaminate absorbing pieces of felt were uniformly suspended in a medium of coarse fibers in a range of proportions and which surprisingly provides for a high degree of filtration and low flow restriction. It was found that if the felt pieces are sufficiently close together so that the oil, passing through the interstices of the coarse fibers, comes into contact with and passes through or permeates the felt, the contaminate, both solid and semi-solid, is absorbed by the felt. Every increment of oil passing through the element mass comes in contact with dirt absorbing felt in that mass and true full flow filtration of lubricating oil is accomplished.

It was found that the improved full flow filter mass of this invention is advantageous for use in treating lubricating oils for all types of engines—from engines for small hand tractors up through the passenger car sizes, also with large commercial engine sizes including diesels. The filter mass herein described is particularly adaptable and suitable in connection with diesel engines because of the high oil flow rate and the high content of contaminate found in diesel oil systems. The invention is also adaptable to use with hydraulic transmissions, both passenger car and heavy duty commercial type. These usually experience high flow rates and high contaminate content as well as high temperature environment making full flow filtration especially desirable.

Accordingly, a fibrous filter element or filter mass for a filter element has been developed and is disclosed herein which is low in cost, effective in clarifying liquids from fine as well as coarse particles, large in effective contact area insofar as the unfiltered fluid is concerned, self-sustaining against the matting effect of fluid under pressure, is such as to permit fluid flow under low pressure drop for an extended life period of use, and is specifically adapted but not necessarily limited to full flow filtration of automotive lubricating oil.

An object of the present invention is to provide an improved fibrous filter element or filter mass for clarifying fluid such as lubricating oil.

Another object is to provide a filter mass capable of serving as a true full flow filter medium in the treatment of engine lubricating oil.

Another object is to provide an improved filter element or filter mass of low cost and long life and which is effective despite the presence of minute particles of foreign matter in the fluid in maintaining a low pressure drop and in clarifying the fluid for an extended operative period.

To these ends, a feature of the present invention is a mass of leaf fibers mixed with pieces shredded from porous felt, the leaf fibers maintaining interstices between the felt pieces to promote penetration of the mass and intimate contact with each of the pieces by fluid such as lubricating oil. Another feature is a filter mass of leaf fibers such as from the group of sisal, jute and hemp fibers separating shredded pieces of felt, the apparent density of the felt being in the range of 15. to 21. pounds per cubic foot, and the percentage of leaf fiber expressed in dry weight of the mass being from 10 percent to about 30 percent nonimpregnated and from 12 percent to about 40 percent when impregnated with resin or from 10 percent to 40 percent as an overall range.

These and other important features of the invention will now be described in detail in the specification and then pointed out more particularly in the appended claims.

In the drawings:

FIGURE 1 is a sectional view of an oil filter arrangement of the depth type in which a filter mass is employed graphically illustrating the present invention; and FIGURE 2 is a perspective, partially sectional and partially exploded view of a filter bag assembly or element further illustrating the nature of the filter mass shown in FIGURE 1.

The drawings, and FIGURE 1 in particular, depict a filter support casting 10 having concentric oil inlet and outlet chambers 12 and 14 respectively. The casting also includes an inlet port (not shown) which leads to the chamber 12 and an outlet port 16 which leads from the chamber 14. A spring pressed relief valve 18 is arranged to bypass fluid around a filter element and from the inlet port to the outlet port 16 in the event the filter element becomes clogged, but details regarding his valve are not set forth herein as the valve forms no part of the present invention. The chambers 12 and 14 are separated by a downwardly directed and annular web 20. Around the margin of the chamber 12 an annular recess is formed in the casting 10 to present a downwardly directed shoulder 22. This shoulder is adapted to receive a gasket 24 which is retained between the shoulder and the upper circular edge of a cylindrical container 26. The latter has a conical formed bottom portion 28 and a horizontal portion 30 through which is received a central post 32. The latter is threaded at its upper end 34 for attachment to a central portion 36 of the casting 10. Interposed between a shoulder 38 on the post 32 and the container 26 are a washer 40 and a gasket 42. The post 32 and the container 26 are rigidly fixed or tightened in their positions with the aid of the hexagonal head 44 on the post.

A disc 48 is provided having a nonperforated annular portion engaging the end of the web 20. Other portions of the disc are perforated as at 50 and 52 to receive the post 32 and to permit discharge of clarified fluid or oil as will further appear. The disc 48 is also provided with spaced notches 54 at its periphery to permit flow of incoming oil to be filtered.

A cloth bag 60 having concentric inner and outer walls 62 and 64 is provided. This bag is toroidal shaped and packed with a mass 66 comprising pieces 67 of shredded felt separated by leaf fibers 69 and is of such configuration or diameter as to leave an annular space 68 defined between it and the inner surface of the container 26. It is of such length as to cause it to press against the disc 48 and the conical portion 28 when the assembly is complete and ready for operation.

A tube 70 having perforation 72 is tightly held by the inner wall 62 of the bag. The tube ends fall short of the ends of the bag 60 so that the latter is distorted slightly in firmly holding the disc 48 in sealed engagement with the annular web 20.

Confined within the bag 60 the mass 66 is presented in the form of a pack and comprises somewhat dispersed pieces 67 shredded from sheet felt. The sheet felt when having a thickness of .080 to .090 inch, may be cut, chopped or torn into pieces retaining that thickness with widths of from ⅛ inch to ¼ inch and lengths ranging from ¼ inch to ¾ inch—i.e.—the preferred volume for each piece of felt 67 ranges from about .0025 to about .017 of a cubic inch.

A suitable sheeted felt from which the pieces 67 may be shredded has been on the market as a "Deadener Felt" and was so known because of its sound absorbing characteristics. One source of such material is the Armstrong Cork Company, located at Liberty and Charlotte Streets, Lancaster, Pennsylvania. Their product is shown as #154 felt when unimpregnated and as #454 RE when impregnated. In order to curtail undesired moisture absorption, this felt should be employed after impregnation with resin although such treatment is not essential in practicing the present invention. A suitable impregnant for the felt sheeting, prior to shredding, is a 1 to 1 mixture of phenol-formaldehyde resin and an aluminum salt of a fatty acid. This gives a resin content of 2 to 3 percent by weight after curing. The base weight of the impregnated sheet felt, as understood by the paper industry, is 57 to 65 pounds per 480 square feet with a thickness of .080 to .090 inch. This converts to an apparent density of from about 15. to 21. pounds per cubic foot.

The composition of the felt prior to impregnation comprises 40 to 45 percent wood fibers, 10 to 15% of jute, wool and/or rayon, and from 35 to 45 percent cotton. The wood fiber is a cooked fiber or cellulose in an impure state. The addition of agents to promote felting or to vary the absorption qualities is permissible. The wood fibers occur in the commercial felt in all degrees of reduction to cellulose and those most reduced are best in augmenting the cotton for creating absorbency of the contaminants in oil. The jute, wool or rayon impart life or "springiness" to the felt although it will be understood that the use of 100 percent cotton felt is permissible although not as effective in practicing the invention.

From the above, it may be seen that the felted organic fibers useful in carrying out the present invention are not such as to necessitate critical proportions of any particular fibers in the felt. In order to supply a large exposure area for effective filtering action, however, it is preferred, in providing the mass 66, to begin with the sheeted or felt material of the stated apparent density—in the range from about 15. to 21. pounds per cubic foot—and to separate that material into discrete pieces by shredding. The felt is cut into pieces of convenient size such as each measuring about .085 of an inch by ⅛ inch by ½ inch. These pieces are mixed with strands of sisal and again passed through choppers or slitters to gain the homogeneous mixture, the further reduction in size of the felt pieces giving each a preferred volume of from .0025 to about .017 of a cubic inch as stated above. Other ingredients such as sawdust may be placed in the mixture at this stage or subsequent thereto but their presence is not preferred or essential.

Sisal is given as an example of the suitable leaf fibers 69 which may be employed in combination with the pieces of felt 67. Jute or hemp may also be employed with or substituted for sisal in the mixture. The function of the leaf fibers 69 is to provide more definite passages in the depth-type filter mass and within the mixture for the oil or fluid to be treated than would exist were the felt pieces 67 used alone. This not only assures effectiveness of a small pressure differential to force the fluid through the filter for a long interval of time but permits the felt pieces individually to become effective in removing dirt efficiently. The leaf fibers 69 maintain their resiliency and thereby serve to "suspend" the pieces 67 or support the mass against undue compact when the filter element is subjected to high fluid pressures. In production, no difficulty is experienced in mixing the felt pieces 67 with the leaf fibers 69 and maintaining the mixture or "suspension" after it is mixed.

The mixture or mass 66 thus provided is ram-packed into a container herein depicted as a cloth or knitted porous bag 60 and the packed bag is installed in the assembly as shown in the drawing. With the mass in the bag to form the filter assembly, the sizes of the felt pieces are such that each linear dimension of each piece is less than half of the filter depth through which the oil must flow. The weight of the mass including the dispersed pieces 67 of felt and the leaf fibers 69 may vary considerably although best results are secured with a mass weight of from 9.0 to 14.0 pounds per cubic foot. Different operating requirements for two elements of the same size may dictate substantially different mass densities. Other factors may induce variations, such factors being by-pass valve setting, fluid flow rate, degree of filtration desired, type of impurity to be removed, pump pressure or suction available, and fluid viscosity and temperature. The physical construction of the element assembly will establish advantageous limits of density. For example, an assembly with a perforated outer shell lockseamed to metal end plates is capable of retaining a much higher material density than a cotton bag as shown in the present drawings.

The percentage range of leaf fibers 69 expressed in dry weight of the mass including felt and leaf fibers is 10 to 30 percent when those ingredients are not impregnated. The preferred range when the ingredients are resin impregnated is from 12 to 40 percent. From this it may be seen that a range of from 10 to 40 percent covers the preferred and reasonable operative proportion of leaf fiber to felt pieces by weight.

The filter mass has a tendency to absorb moisture from the atmosphere thereby causing a loss of resiliency or the softening of the fibers, particularly the leaf fibers 69. This leads to compacting of the mass and an increase in flow restriction. Impregnation of the felt before shredding and also of the leaf fibers before mixing minimizes moisture absorption. Treatment of the felt with resin has been mentioned above. The leaf fiber is given a resin content of about 15 to 20 percent by weight when cured, the impregnant being phenol-formaldehyde resin. In this connection, however, it is to be understood that impregnation, although preferred, need not be resorted to in successfully practicing the present invention to a degree which is surprising in the depth type or full flow oil filter field.

In operation, oil containing sludge is admitted to the annular chamber 12. It passes down into the space 68 and surrounds the bag 60. The oil permeates the mass 66 and is clarified by the felt pieces 67. Clear oil is discharged through the holes 72 and upwardly through the tube 70 and the holes 52 to the chamber 14 for delivery to the system served. Such delivery is by way of the outlet port 16.

Applicant has experimented with many fibrous mixtures and has found that the mass 66 herein disclosed is characterized by a much more than substantial increase in effective and efficient service life as compared with the best mixture or mass employed for the purpose heretofore and as encountered in considerable experience along this line. The percentage of foreign matter removed from lubricating oil, for example, was very satisfactory during the entire expanded span of the service life of each filter element or mass. At the same time, the maximum pressure drop in passing through the mass 66 was substantially reduced compared with the best of other masses, none of which may properly be called true full flow masses. These characteristics are outstanding and are exhibited even though the specific composition and proportions be changed as indicated with regard to the discrete felt pieces 67, the leaf fiber content and any additives in minor quantities deemed necessary to suit given circumstances.

The basic concept of the invention should be clear from the explanation given above but it may be stated concisely by pointing out that the leaf fibers 69 keep the flow paths open as necessary for a long-life depth type filter and major filtering action is performed by the felt pieces 67. The differential pressure with respect to opposite sides of each piece of felt (although perhaps immeasureable) is such as to effect a flow through the piece and thereby clarify the fluid being treated.

I claim:

1. A filter element comprising a porous container, a mass of leaf fibers such as sisal, jute and hemp and discrete pieces of organic felted fibers packed in said container with said leaf fibers maintaining interstices between said pieces whereby penetration to each piece of said mass by fluid to be filtered is promoted, the weight of said mass of fibers and pieces being from 9.0 to 14.0 pounds per cubic foot, said pieces including about 40 to 45 percent wood fiber and averaging from .0025 to .017 of a cubic inch in volume; and said leaf fibers being from 10 to 40 percent of said mass by dry weight.

2. A two-phase filter mass forming a pack having a depth through which fluid may be passed, said mass having a weight of from 9.0 to 14.0 pounds per cubic foot and comprising pieces of organic fibers constituting one phase and leaf fibers forming the other phase, said pieces being shredded from felted sheets with an apparent density of 15. to 21. pounds per cubic foot and a wood fiber content of from 40 to 45 percent by dry weight, the volume of said pieces averaging from .0025 to .017 of a cubic inch, each of said pieces having each of its dimensions less than half of the said depth, said leaf fibers serving substantially uniformly to disperse said pieces and being from the group of sisal, jute or hemp fibers, and flow passages being maintained between adjacent pieces by said leaf fibers.

3. A packed filter mass adapted to serve as a filtering medium, said mass comprising pieces of organic felted fibers uniformly dispersed in leaf fibers, each linear dimension of each piece being less than half of the depth of said filter mass through which a fluid is to flow, the said felted fibers having an apparent density of from 15. to 21. pounds per cubic foot, said leaf fibers being from 10 to 40 percent of the felted fibers by dry weight, said leaf fibers being adapted to promote fluid penetration of the mass and to resist compacting of the latter, and said mass having a weight of from 9.0 to 14.0 pounds per cubic foot.

4. A two-phase filter pack comprising a mass of organic fibers shredded into discrete pieces from sheet felt having an apparent density of 15. to 21. pounds per cubic foot, said pieces constituting one phase, leaf fibers constituting from 10 to 40 percent of said mass by dry weight and forming the other phase, said pieces of said one phase being substantially uniformly dispersed in said other phase whereby fluid passages to each of said pieces are provided, each of said pieces having a volume of from about .0025 to about .017 of a cubic inch, and said mass having a weight of from 9.0 to 14.0 pounds per cubic foot.

5. A packed and confined two-phase filter mass comprising one phase of leaf fibers and one phase of pieces of porous felt, said leaf fibers being substantially non-absorbent and arranged in the mass substantially uniformly to separate said pieces thereby resiliently to maintain interstices between the latter in the interest of minimizing pressure drop, and said felt having an apparent density of from 15. to 21. pounds per cubic foot and a wood fiber content of from 40 to 45 percent to promote filtering effectiveness.

6. A two-phase filter mass in the form of a pack having a depth through which fluid may be passed, said mass comprising leaf fibers and pieces of porous felt, said leaf fibers resiliently sustaining and substantially uniformly dispersing said pieces to maintain flow passages around each of the latter, each dimension of each of said pieces being less than one-half of said depth, the proportion of said leaf fibers in said mass being from 10 to 40 percent by dry weight, and said mass having a weight of from 9.0 to 14.0 pounds per cubic foot.

References Cited in the file of this patent

UNITED STATES PATENTS

| | | |
|---|---|---|
| 623,955 | Gage | Apr. 25, 1899 |
| 2,116,537 | Miller | May 10, 1938 |
| 2,148,708 | Orr | Feb. 28, 1939 |
| 2,152,901 | Manning | Apr. 4, 1939 |
| 2,248,131 | Smith | July 8, 1941 |
| 2,336,797 | Maxwell | Dec. 14, 1943 |
| 2,345,849 | Winslow | Apr. 4, 1944 |
| 2,708,982 | McGruff | May 24, 1955 |
| 2,746,608 | Briggs | May 22, 1956 |

FOREIGN PATENTS

| | | |
|---|---|---|
| 752,827 | Great Britain | July 18, 1956 |